United States Patent
Lee et al.

(10) Patent No.: US 9,501,807 B2
(45) Date of Patent: Nov. 22, 2016

(54) DETECTING SYSTEM AND DETECTING METHOD FOR PRODUCTS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Teh-Yuh Lee, New Taipei (TW); Wei-Wei Jiang, Shenzhen (CN); Wei-Jung Hung, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 86 days.

(21) Appl. No.: 14/540,204

(22) Filed: Nov. 13, 2014

(65) Prior Publication Data
US 2015/0210481 A1 Jul. 30, 2015

(30) Foreign Application Priority Data
Jan. 25, 2014 (CN) .......................... 2014 1 0034584

(51) Int. Cl.
*G06F 7/00* (2006.01)
*G06T 1/00* (2006.01)
*G06T 7/00* (2006.01)

(52) U.S. Cl.
CPC ........... *G06T 1/0007* (2013.01); *G06T 7/0004* (2013.01)

(58) Field of Classification Search
None
See application file for complete search history.

(56) References Cited

U.S. PATENT DOCUMENTS

2008/0035390 A1* 2/2008 Wurz .................... G01B 11/04
177/25.15

* cited by examiner

*Primary Examiner* — Yolanda Cumbess
(74) *Attorney, Agent, or Firm* — Zhigang Ma

(57) ABSTRACT

A detecting system for checking shapes, sizes, and/or positions of products, includes a feeding module configured to transfer the products into the detecting system, a detecting module configured to detect the products, a discharging module configured to remove the products out of the detection system, a conveying module configured to transport the products, a data processing module configured to deal with the data information measured by the detecting module, and an electronic control module configured to control the feeding module, the detecting module, the discharging module, the conveying module, and the data processing module. The detecting module includes a first detection module configured to get size and position images of the products, and a second detecting unit configured to detect a gap between two planes of the products. The present disclosure also discloses a detecting method for products.

9 Claims, 6 Drawing Sheets

DETECTING SYSTEM AND DETECTING METHOD FOR PRODUCTS

FIELD

The subject matter herein generally relates to detecting systems and methods for detecting products, and particularly to a system and method for detecting shapes, sizes, and/or positions of products.

BACKGROUND

On an assembly line, products need to be checked regularly for constancy, shapes, sizes and/or positions. Typically, the checking procedure is done manually by workmen using simple tools.

BRIEF DESCRIPTION OF THE DRAWINGS

Implementations of the present technology will now be described, by way of example only, with reference to the attached figures.

DETAILED DESCRIPTION

Figure 1:
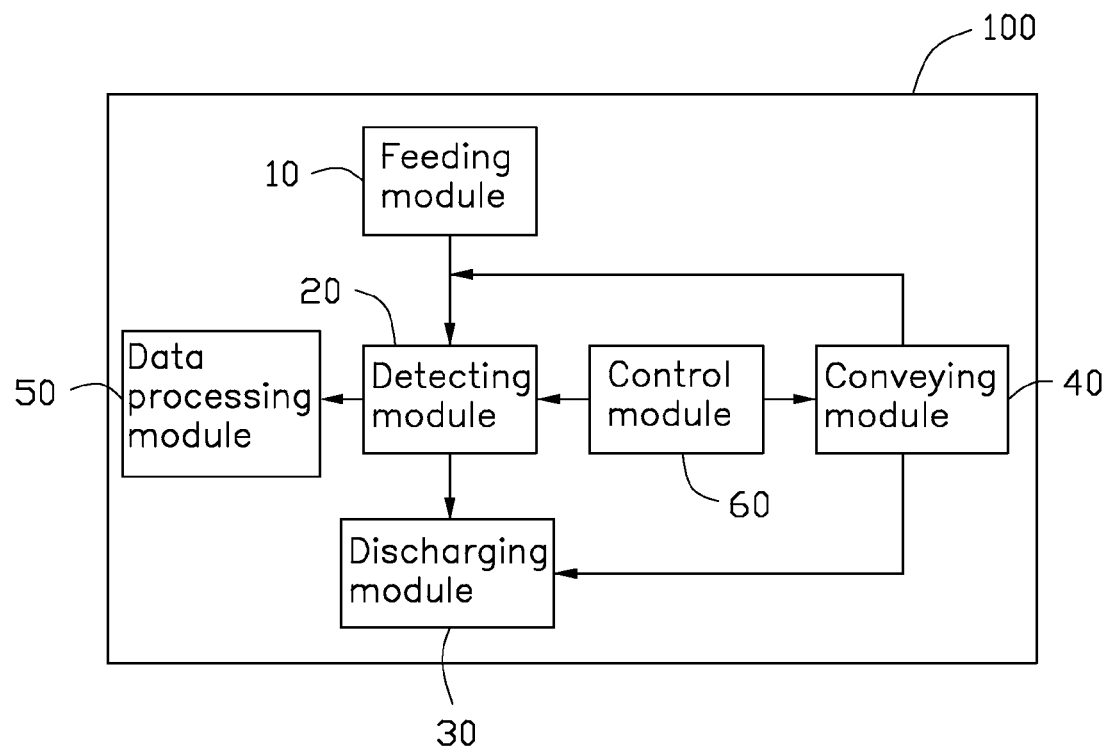
FIG. 1 is a structural diagram of an embodiment of a detecting system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising", when utilized, means "including, but not necessarily limited to"; it specifically indicates open-ended inclusion or membership in the so-described combination, group, series, and the like.

The present disclosure is described in relation to a detecting system and an operation method of the detecting system for products.

FIG. 1 illustrates a structural diagram of a detecting system. The detecting system 100 can include a feeding module 10, a detecting module 20, a discharging module 30; a conveying module 40, a data processing module 50, and a control module 60. The feeding module 10 can be configured to supply the detecting system 100 with a plurality of products 200. The detecting module 20 can be configured to detect shapes, sizes and/or positions of the products 200. The discharging module 30 can be configured to remove the finished products 200 from the detecting system 100. The conveying module 40 can be configured to transport the products 200 from the feeding module 10 to the detecting module 20, or from the detecting module 20 to the discharging module 30.

The data processing module 50 can be electrically connected to the detecting module 20. The data processing module 50 can collect data information measured by the detecting module 20, and determine whether the products 200 are qualified or not according to the data information. The data processing module 50 can include a display configured to show a diagram of product 200 numbers and quality information corresponding to the product 200 numbers. A workman can achieve the quality information of products 200 by looking at the display. In at least one embodiment, an alarm (not shown) can be electrically connected to the data processing module 50, when the data processing module 50 picks up an unqualified product 200, the alarm sounds, warning the workman of the unqualified product 200.

The feeding module 10, the detecting module 20, the discharging module 30, the conveying module 40, and the data processing module 50 can be electrically connected to, and controlled by the control module 60.

Figure 2:
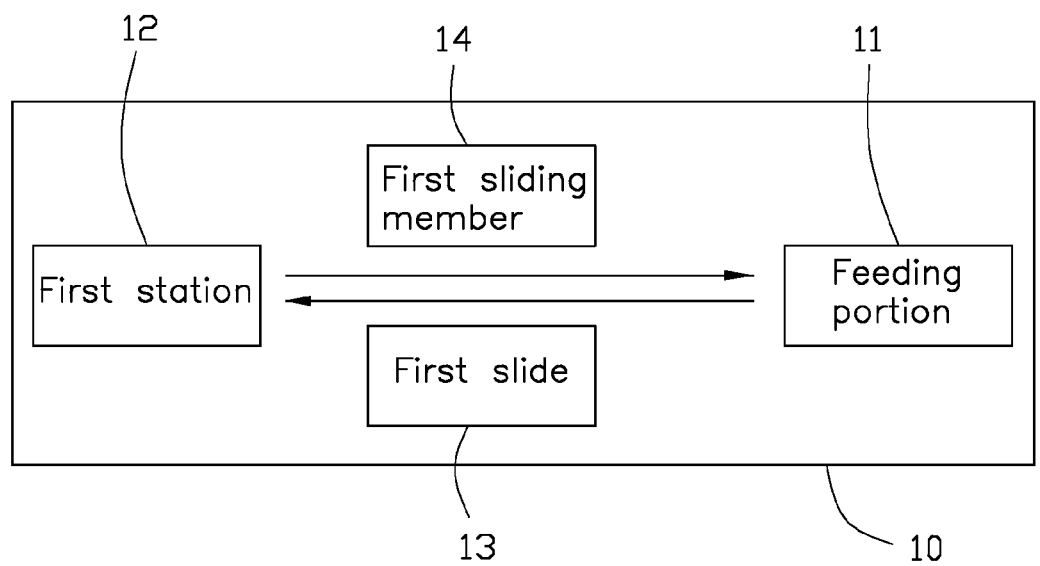
FIG. 2 is a structural diagram of the feeding module of FIG. 1.

FIG. 2 illustrates a structural diagram of the feeding module 10 of the detecting system. The feeding module 10 can include a feeding portion 11, a first station 12 opposite to the feeding portion 11, a first slide 13 positioned between the feeding portion 11 and the first station 12, and a first sliding member 14 coupled to the first slide 13. The first sliding member 14 can move between the feeding portion 11 and the first station 12. When the first sliding member 14 is positioned on the feeding portion 11, and the products 200 to be detected can be loaded into the first sliding member 14. The first sliding member 14 can convey the products 200 from the feeding portion 11 to the first station 12. Then the first sliding member 14 can return to the feeding portion 11.

Figure 3:
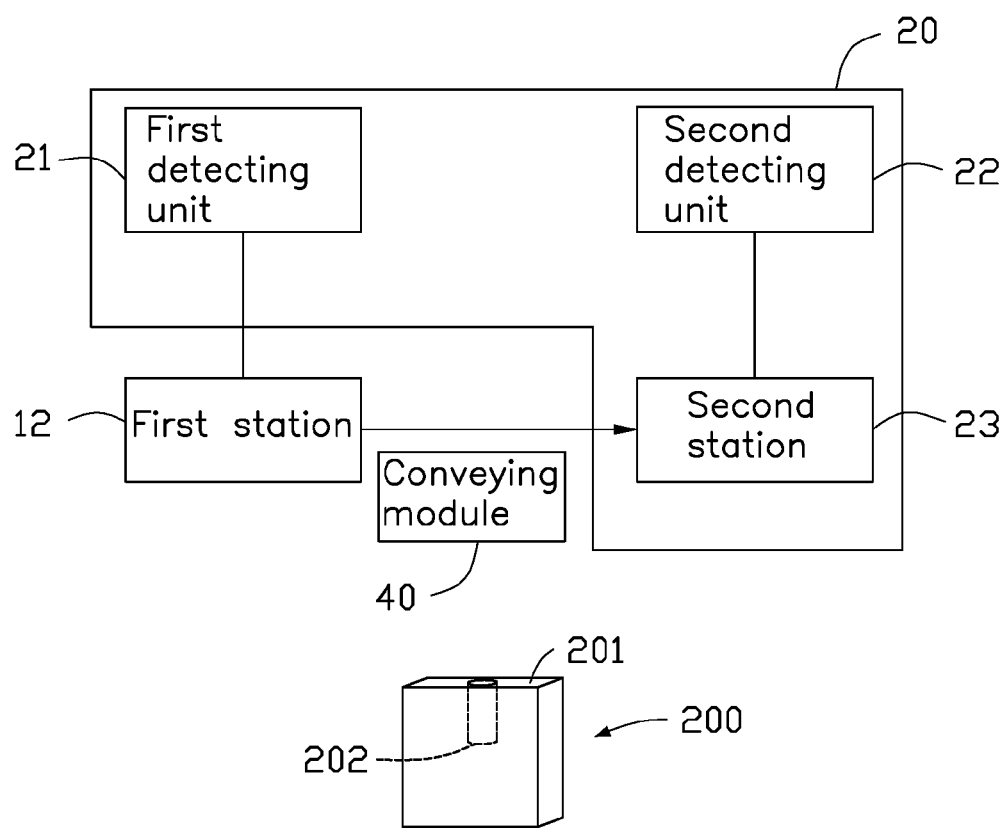
FIG. 3 is a structural diagram of the detecting module of FIG. 1.

FIG. 3 illustrates a structural diagram of the detecting module 20 of the detecting system. The detecting module 20 can include a first detecting unit 21 corresponding to the first station 12 (see in FIG. 2), a second detecting unit 22, and a second station 23 corresponding to the second detecting unit 22. The first detecting unit 21 can include a charge-coupled device (CCD) configured to get size and position images of the products 200.

The second detecting unit 22 can include a measurement probe configured to detect a height difference between two planes 201 and 202 of the products 200. In the illustrated embodiment, a product 200 can be detected by the first detecting unit 21 first, then the product 200 can be transported from the first station 12 (see FIG. 2) to the second station 23 by the conveying module 40 (see FIG. 1), and detected by the second detecting unit 22.

Figure 4:
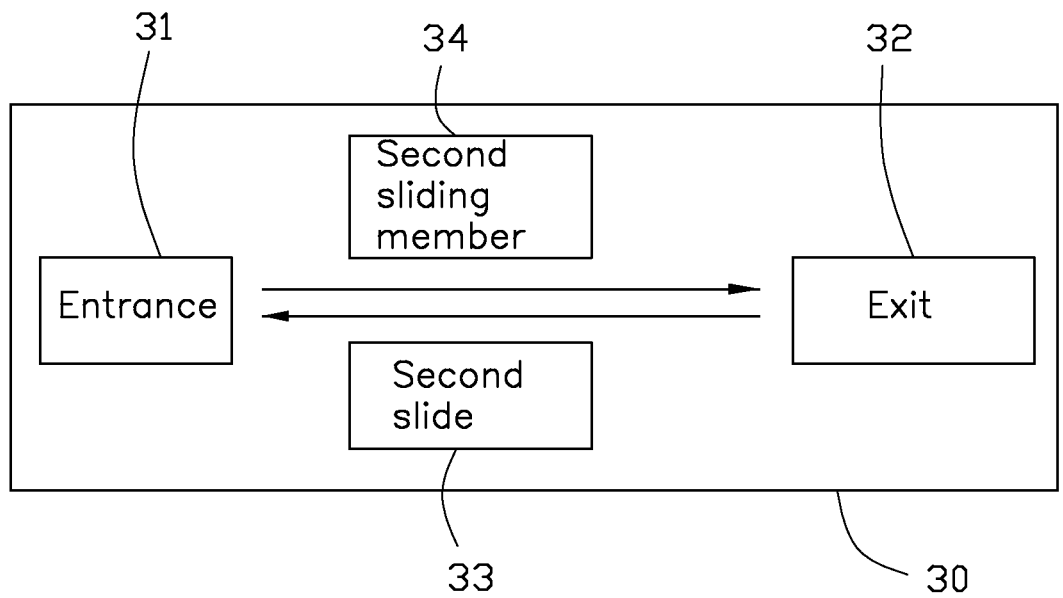
FIG. 4 is a structural diagram of the discharging module of FIG. 1.

FIG. 4 illustrates a structural diagram of the discharging module 30 of the detecting system. A function of the discharging module 30 can be opposite to a function of the feeding module 10. The discharging module 30 can include an entrance 31 configured to receive the finished products 200 from the detecting module 20, an exit 32 opposite to the entrance 31, a second slide 33 connected between the entrance 31 and the exit 32; and a second sliding member 34 coupled to the second slide 33. The second sliding member 34 can move between the entrance 31 and the exit 32. When the second sliding member 34 moves to the entrance 31, the second sliding member 34 can receive a product 200, and drive the product 200 to the exit 32.

Figure 5:
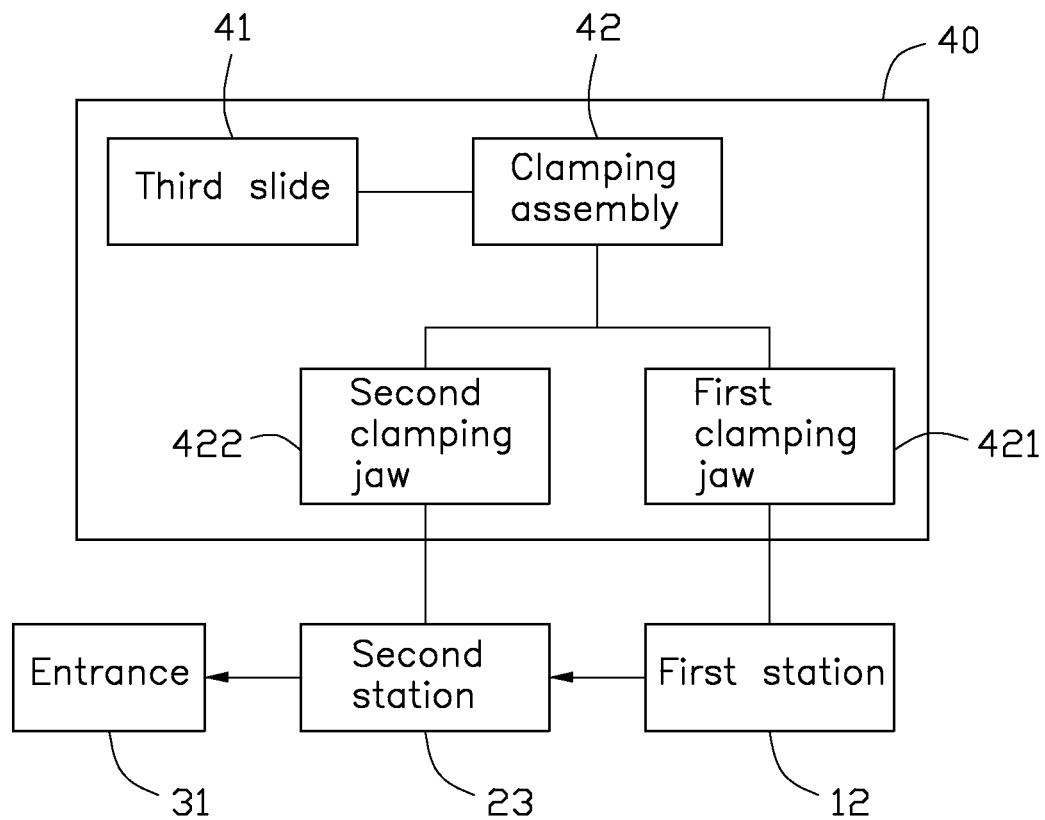
FIG. 5 is a structural diagram of the conveying module of FIG. 1.

FIG. 5 illustrates a structural diagram of the conveying module 40. The conveying module 40 can include a third slide 41, and a clamping assembly 42 coupled to the third slide 41. The clamping assembly 42 can be configured to clamp the products 200, and include a first clamping jaw 421 and a second clamping jaw 422 coupled to the first clamping jaw 421. The first clamping jaw 421 can be move between the first station 12 and the second station 23. The second clamping jaw 422 can move between the second station 23 and the entrance 31 of the discharging module 30. In the illustrated embodiment, the first clamping jaw 421 and the second clamping jaw 422 can be linked together. When the first clamping jaw 421 is positioned at the first station 12, the second clamping jaw 422 can be positioned at the second station 23. When the first clamping jaw 421 moves to the second station 23, the second clamping jaw 422 can move to the entrance 31 of the discharging module 30.

Figure 6:
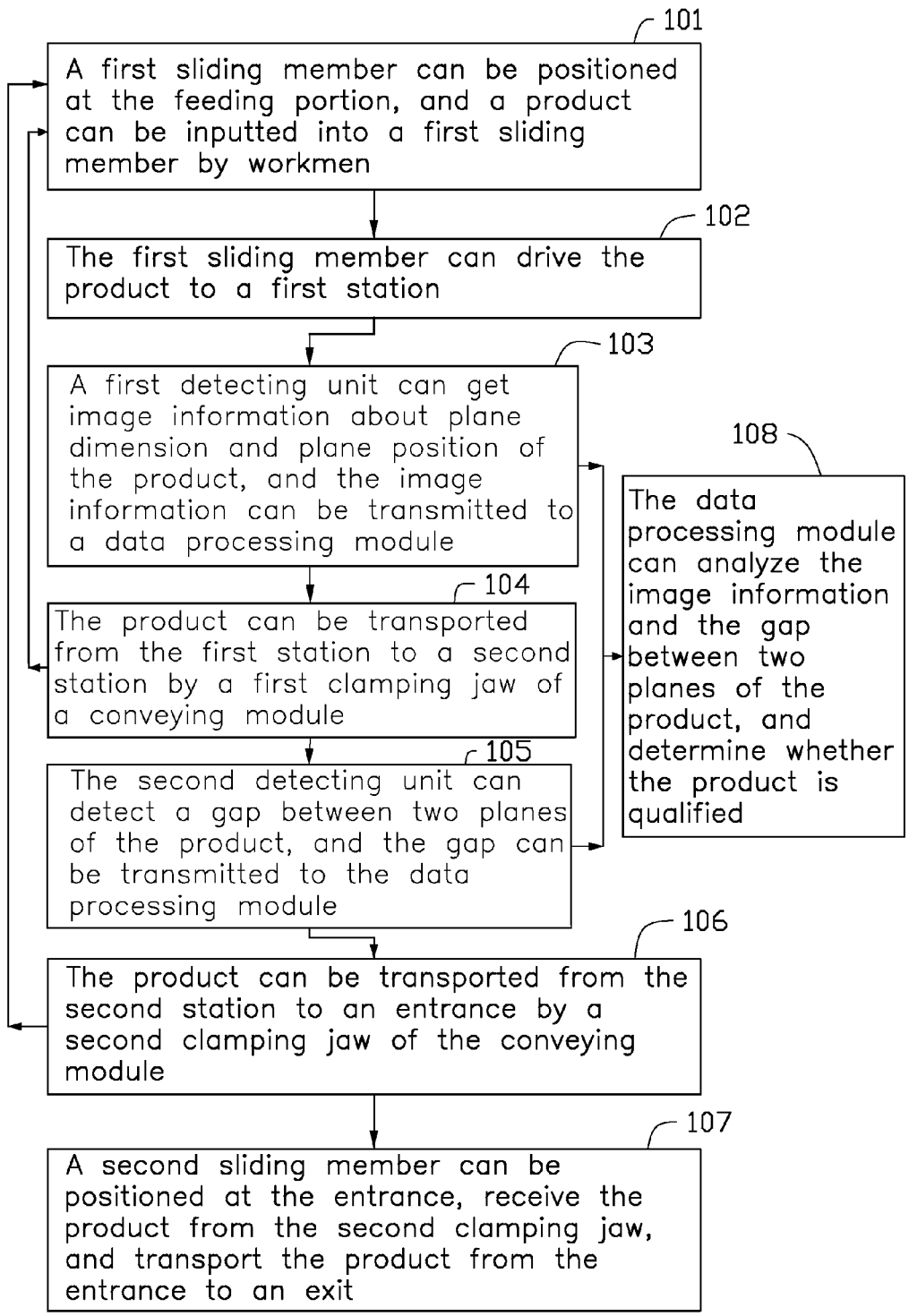
FIG. 6 is a flow diagram of a process for an operation method of the detecting system for products.

FIG. 6 illustrates a method for using the detecting system 100, which can include the following.

In block 101, the first sliding member 14 can be positioned at the feeding portion 11, and a product 200 can be inputted into the first sliding member 14 by workmen.

In block 102, the first sliding member 14 can drive the product 200 to the first station 12.

In block 103, the first detecting unit 21 can get image information about plane dimension and plane position of the product 200, and the image information can be transmitted to the data processing module 50.

In block 104, the product 200 can be transported from the first station 12 to the second station 23 by the first clamping jaw 421 of the conveying module 40.

In block 105, the second detecting unit 22 can detect a height difference between two planes 201 and 202 of the product 200, and the height difference can be transmitted to the data processing module 50.

In block 106, the product 200 can be transported from the second station 23 to the entrance 31 by the second clamping jaw 422 of the conveying module 40.

In block 107, the second sliding member 34 can be positioned at the entrance 31, receive the product 200 from the second clamping jaw 422, and transport the product 200 from the entrance 31 to the exit 32.

In block 108, the data processing module 50 can analyze the image information and the height difference between two planes 201 and 202 of the product 200, and determine whether the product 200 is qualified.

In use, a first product can be positioned at the first station 12 and detected by the first detecting unit 21. At the same time, a second product 200 can be ready to enter into the detecting system 100. When the first product 200 is transported from the first station 12 to the second station 23 by the first clamping jaw 421 of the conveying module 40, the second product 200 can be driven to the first station 12 by the first sliding member 14. Then the first product 200 can be detected by the second detecting unit 22, and the second product 200 can be detected by the first detecting unit 21. The first product 200 can be transported from the second station 23 to the entrance 31 by the first clamping jaw 422 of the conveying module 40. Meanwhile, the second product 200 can be transported from the first station 12 to the second station 23 by the first clamping jaw 421 of the conveying module 40. The second sliding member 34 drives the first product 200 to the exit 32, and the second product 200 can be detected by the second detecting unit 22.

The detecting system 100 can automatically detect a plurality of products 200. Compared with the manual vision inspection (MVI), the detecting system 100 can enhance the efficiency of detecting products 200.

The embodiments shown and described above are only examples. Many details are often found in the art such as the other features of a detecting system and a detecting method for products. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A detecting system comprising:
   a feeding module configured to transfer products into the detecting system, the feeding module comprising:
     a feeding portion;
     a first station opposite to the feeding portion;
     a first slide positioned between the feeding portion and the first station; and
     a first sliding member coupled to the first slide;
   a detecting module comprising:
     a first detecting unit configured to get images about plane dimension and plane position of the products; and
     a second detecting unit configured to detect a height difference between two planes of each product;
   a discharging module configured to remove finished products out of the detecting system;
   a conveying module configured to transport the products from the feeding module to the detecting module;
   a data processing module electrically connected to the detecting module and collect information of the images and the height difference between two planes of each product, wherein the data processing module is configured to determine whether the products are qualified or not according to the information; and
   a control module electrically connected to, and configured to control the feeding module, the detecting module, the discharging module; the conveying module, and the data processing module.

2. The detecting system as claimed in claim 1, wherein the first sliding member drives the products from the feeding portion to the first station, and the first detecting unit corresponds to the first station.

3. The detecting system as claimed in claim 1, wherein the detecting module further comprises a second station corresponding to the second detecting unit.

4. The detecting system as claimed in claim 3, wherein the conveying module comprises a third slide and a clamping assembly coupled to the third slide, the clamping assembly configured to clamp the products.

5. The detecting system as claimed in claim 4, wherein the clamping assembly comprises a first clamping jaw and a second clamping jaw coupled to the first clamping jaw, the first clamping jaw moves between the first station and the second station, and the second clamping jaw moves between the second station and the discharging module.

6. The detecting system as claimed in claim 1, wherein the discharging module comprises an entrance configured to receive the finished products from the detecting module, an exit opposite to the entrance, a second slide connected between the entrance and the exit, and a second sliding member coupled to the second slide.

7. The detecting system as claimed in claim 6, wherein the second sliding member drives the product from the entrance to the exit.

8. A detecting method comprising:
   a product moves to a first station driven by a feeding module;
   a first detecting unit gets image information about plane dimension and plane position of the product, and the image information is transmitted to a data processing module;
   the product is transported from the first station to a second station by a conveying module, wherein when the product is transported from the first station to the second station by a first clamping jaw of the conveying module, at the same time, another product is driven to the first station;
   a second detecting unit detects a height difference between two planes of each product, and the height difference is transmitted to the data processing module;
   the product is transported from the second station to a discharging module by the conveying module; and
   the data processing module analyzes the image information and the height difference of the product, and determines whether the product is qualified or not.

9. The detecting method as claimed in claim 8, wherein the product is detected by the second detecting unit, meanwhile, the another product is detected by the first detecting unit.

* * * * *